United States Patent
Rey et al.

(10) Patent No.: US 9,308,474 B2
(45) Date of Patent: *Apr. 12, 2016

(54) DEMULSIFICATION COMPOSITIONS, SYSTEMS AND METHODS FOR DEMULSIFYING AND SEPARATING AQUEOUS EMULSIONS

(71) Applicants: Kroff Chemical Company, Pittsburgh, PA (US); Dow AgroSciences LLC, Indianapolis, IN (US)

(72) Inventors: Paul Rey, Coraopolis, PA (US); David M. Sunderlik, Washington Township, MI (US); Steven P. Ceplecha, Harbor Beach, MI (US)

(73) Assignees: KROFF CHEMICAL COMPANY, Pittsburgh, PA (US); DOW AGROSCIENCES, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,930

(22) Filed: Jun. 23, 2014

(65) Prior Publication Data

US 2014/0303265 A1    Oct. 9, 2014

Related U.S. Application Data

(62) Division of application No. 13/603,865, filed on Sep. 5, 2012, now Pat. No. 8,796,433, which is a division of application No. 12/417,683, filed on Apr. 3, 2009, now Pat. No. 8,268,975.

(51) Int. Cl.
  *B01D 17/05*    (2006.01)
  *B01D 17/04*    (2006.01)

(52) U.S. Cl.
  CPC .................................. *B01D 17/047* (2013.01)

(58) Field of Classification Search
  CPC ....... C08G 77/46; C08G 77/26; B01D 17/047
  See application file for complete search history.

(56) References Cited

U.S. PATENT DOCUMENTS

| | | |
|---|---|---|
| 3,240,670 A | 3/1966 | Feinberg |
| 3,240,721 A | 3/1966 | Fordyce |
| 3,389,160 A | 6/1968 | Reid |
| 3,663,373 A | 5/1972 | Berger et al. |
| 3,725,312 A | 4/1973 | Panzer et al. |
| 3,738,945 A | 6/1973 | Panzer et al. |
| 3,782,546 A | 1/1974 | Kirwin et al. |
| 3,790,522 A | 2/1974 | Bliss |
| 3,975,347 A | 8/1976 | Phillips et al. |
| 4,001,486 A | 1/1977 | Phillips |
| 4,083,856 A | 4/1978 | Mendicino |
| 4,092,467 A | 5/1978 | Welcher et al. |
| 4,151,202 A | 4/1979 | Hunter et al. |
| 4,158,521 A | 6/1979 | Anderson et al. |
| 4,183,820 A | 1/1980 | Theile et al. |
| 4,390,650 A | 6/1983 | Deiner et al. |
| 4,508,825 A | 4/1985 | Kim et al. |
| 4,584,125 A | 4/1986 | Griswold et al. |
| 4,596,653 A | 6/1986 | Graham et al. |
| 4,597,962 A | 7/1986 | Grollier et al. |
| 4,680,366 A | 7/1987 | Tanaka et al. |
| 4,722,951 A | 2/1988 | Yoshioka et al. |
| 4,840,748 A | 6/1989 | Bellos et al. |
| 4,842,851 A | 6/1989 | Grollier et al. |
| 4,857,593 A | 8/1989 | Leung et al. |
| 4,871,530 A | 10/1989 | Grollier et al. |
| 4,888,107 A * | 12/1989 | Easton et al. .................. 208/188 |
| 4,891,166 A | 1/1990 | Schaefer et al. |
| 4,895,964 A | 1/1990 | Margida |
| 4,961,858 A | 10/1990 | Spei et al. |
| 4,997,759 A | 3/1991 | Cibulskas et al. |
| 5,004,559 A | 4/1991 | Koerner et al. |
| 5,013,452 A | 5/1991 | Bellos et al. |
| 5,015,391 A | 5/1991 | Mohn |
| 5,024,937 A | 6/1991 | Penticoff et al. |
| 5,045,225 A | 9/1991 | Aronson et al. |
| 5,098,979 A | 3/1992 | O'Lenick, Jr. |
| 5,115,049 A | 5/1992 | Imperante et al. |
| 5,153,294 A | 10/1992 | O'Lenick, Jr. |
| 5,154,759 A | 10/1992 | Cifuentes et al. |
| 5,166,297 A | 11/1992 | O'Lenick, Jr. |
| 5,176,847 A | 1/1993 | Kremer |
| 5,196,499 A | 3/1993 | O'Lenick, Jr. |

(Continued)

FOREIGN PATENT DOCUMENTS

| | | |
|---|---|---|
| DE | 3731477 A1 | 3/1988 |
| DE | 3719086 C1 | 10/1988 |

(Continued)

OTHER PUBLICATIONS

Nilsen et al., Applied and Environmental Microbiology, Feb. 1996, pp. 728-731.*
Bartlett et al. Res. Microbiol. 146 (1995) 697-706.*
Birkeland, "The microbial diversity of deep subsurface oil reservoirs" in Studies in Surface Science and Catalysis 151, Ed. Vaquez-Duhalt et al., Chapter 14, 2004, pp. 385-397, Elsevier B.V.
Brook et al., Silicone-protein surfactants; stability of water-in-silicone oil emulsions, Silicon Chemistry, 2002, pp. 99-106, vol. 1.
Dalmazzone et al., Mechanism of Crude-Oil/Water Interface Destabilization by Silicone Demulsifiers, SPE Journal, Mar. 2005, pp. 44-53.
Dalmazzone et al., Development of New "green" Demulsifiers for Oil Production, Society of Petroleum Engineers Inc., SPE 65041, 2001, pp. 1-9.
Jarudilokkul et al., The effect of demulsifiers on lysozyme extraction from hen egg white using reverse micelles, Bioseparation, 2000, pp. 81-91, vol. 9.

(Continued)

*Primary Examiner* — Kuo-Liang Peng
(74) *Attorney, Agent, or Firm* — The Webb Law Firm (57) ABSTRACT

The present invention provides compositions, systems and methods for demulsifying an emulsion including an aqueous phase and an organic phase by adding an effective amount of a composition comprising at least one quaternary organopolysiloxane or salt thereof to the emulsion, the composition optionally including at least one of quaternary epihalohydrin/polyamine copolymers or salts, and/or (poly)diallyldimethylammonium halides.

3 Claims, 3 Drawing Sheets

(56) References Cited

U.S. PATENT DOCUMENTS

| | | |
|---|---|---|
| 5,204,015 A | 4/1993 | Caldwell et al. |
| 5,209,775 A | 5/1993 | Bank et al. |
| 5,244,598 A | 9/1993 | Merrifield et al. |
| 5,247,108 A | 9/1993 | Hirai et al. |
| 5,302,657 A | 4/1994 | Huhn et al. |
| 5,314,562 A | 5/1994 | McDonnell et al. |
| 5,328,685 A | 7/1994 | Janchitraponvej et al. |
| 5,362,634 A | 11/1994 | Boeck et al. |
| 5,378,787 A | 1/1995 | Vrckovnik et al. |
| 5,389,405 A | 2/1995 | Purnell et al. |
| 5,428,089 A | 6/1995 | Ishikawa et al. |
| 5,451,431 A | 9/1995 | Purnell et al. |
| 5,474,835 A | 12/1995 | McCarthy et al. |
| 5,478,870 A | 12/1995 | Kudoh et al. |
| 5,516,361 A | 5/1996 | Chow et al. |
| 5,518,533 A | 5/1996 | Howe |
| 5,531,813 A | 7/1996 | Henry et al. |
| 5,560,832 A | 10/1996 | Sivakumar et al. |
| 5,607,574 A | 3/1997 | Hart |
| 5,707,531 A | 1/1998 | Lehmann et al. |
| 5,921,912 A | 7/1999 | Hart et al. |
| 5,925,341 A | 7/1999 | Cervantes et al. |
| 6,008,145 A | 12/1999 | Dzen et al. |
| 6,136,304 A | 10/2000 | Pyles |
| 6,172,123 B1 | 1/2001 | Lindert et al. |
| 6,245,921 B1 | 6/2001 | Barta et al. |
| 6,258,367 B1 | 7/2001 | Dupuis |
| 6,398,860 B1 | 6/2002 | Ona et al. |
| 6,407,274 B1 | 6/2002 | Vrckovnik et al. |
| 6,409,934 B1 | 6/2002 | Naganawa et al. |
| 6,455,504 B1 | 9/2002 | Lewer et al. |
| 6,512,016 B2 | 1/2003 | Khan et al. |
| 6,534,667 B1 | 3/2003 | Standke et al. |
| 6,547,981 B2 | 4/2003 | Messner et al. |
| 6,638,749 B1 | 10/2003 | Beckman et al. |
| 6,649,689 B2 | 11/2003 | Gosselink et al. |
| 6,656,977 B2 | 12/2003 | Slone et al. |
| 6,746,623 B2 | 6/2004 | Slone et al. |
| 6,855,173 B2 | 2/2005 | Ehrnsperger et al. |
| 6,867,318 B1 | 3/2005 | Cui |
| 6,878,770 B2 | 4/2005 | Herzig et al. |
| 6,946,536 B2 | 9/2005 | Tashiro |
| 6,951,598 B2 | 10/2005 | Flugge et al. |
| 7,041,767 B2 | 5/2006 | Lange et al. |
| 7,153,585 B2 | 12/2006 | Audenaert et al. |
| 7,217,777 B2 | 5/2007 | Lange et al. |
| 7,390,479 B2 | 6/2008 | Socket et al. |
| 8,268,975 B2 | 9/2012 | Rey et al. |
| 2002/0129542 A1 | 9/2002 | Grabowski et al. |
| 2004/0048996 A1 | 3/2004 | Lange et al. |
| 2004/0092424 A1 | 5/2004 | Boutique et al. |
| 2005/0009934 A1 | 1/2005 | Slone et al. |
| 2005/0255073 A1 | 11/2005 | Sockel et al. |
| 2006/0249882 A1 | 11/2006 | Boinowitz et al. |
| 2006/0286059 A1 | 12/2006 | Yang et al. |
| 2007/0051274 A1 | 3/2007 | Saito et al. |
| 2007/0112078 A1 | 5/2007 | Procter et al. |
| 2007/0185281 A1 | 8/2007 | Song et al. |
| 2007/0249502 A1 | 10/2007 | Procter et al. |
| 2007/0275122 A1 | 11/2007 | Cazaroto et al. |
| 2007/0299143 A1 | 12/2007 | Koczo et al. |
| 2007/0299178 A1 | 12/2007 | Cook et al. |
| 2008/0076840 A1 | 3/2008 | Flatt |
| 2012/0329915 A1 | 12/2012 | Rey et al. |

FOREIGN PATENT DOCUMENTS

| | | |
|---|---|---|
| DE | 19853720 A1 | 5/2000 |
| EP | 0017121 A1 | 10/1980 |
| EP | 0017122 A1 | 10/1980 |
| EP | 0141585 A2 | 5/1985 |
| EP | 0349926 A2 | 1/1990 |
| EP | 0714654 A1 | 6/1996 |
| EP | 1199350 A1 | 4/2002 |
| EP | 1527768 A1 | 5/2005 |
| EP | 1561770 A1 | 8/2005 |
| EP | 1595910 A1 | 11/2005 |
| GB | 1281108 A | 7/1972 |
| GB | 1305823 | 2/1973 |
| GB | 1360398 A | 7/1974 |
| GB | 2188060 A | 9/1987 |
| GB | 2190393 A | 11/1987 |
| JP | 8217882 A | 8/1996 |
| JP | 2005520500 A | 7/2005 |
| JP | 201058046 A | 3/2010 |
| WO | 9309126 A1 | 5/1993 |
| WO | 9420518 A1 | 9/1994 |
| WO | 9700265 A1 | 1/1997 |
| WO | 9738067 A1 | 10/1997 |
| WO | 0009453 A1 | 2/2000 |
| WO | 0153071 A1 | 7/2001 |
| WO | 0210257 A1 | 2/2002 |
| WO | 03070908 A2 | 8/2003 |
| WO | 03078504 A1 | 9/2003 |
| WO | 2004041987 A1 | 5/2004 |
| WO | 2004089846 A1 | 10/2004 |
| WO | 2004089852 A1 | 10/2004 |
| WO | 2004092424 A1 | 10/2004 |
| WO | 2005063855 A1 | 7/2005 |
| WO | 2007067728 | 6/2007 |
| WO | 2008036910 A2 | 3/2008 |

OTHER PUBLICATIONS

Kim et al., Surface Active Properties and LCST Behavior of Oligo (propylene oxide-block-ethylene oxide) Allyl Ether Siloxane Surfactants in Aqueous Solution, Bull. Korean Chem. Soc., 2004, pp. 1182-1188, vol. 25, No. 8.

O'Lenick JR., Silicones for Personal Care, Jan. 2003, pp. 80-89, Allured Pub Corp., Carol Stream, IL, USA.

Nilsen et al., Methanococcus thermolithotrophicus Isolated from North Sea Oil Field Reservoir Water, Applied and Environmental Microbiology, Feb. 1996, vol. 62, No. 2, pp. 728-731.

Paulis et al., A New Family of Demulsifiers for Treating Oilfield Emulsions, Society of Petroleum Engineers, Inc., SPE 37269, 1997, pp. 583-589.

Soudmand-Asli et al., "The in situ microbial enhanced oil recovery in fractured porous media", Journal of Petroleum Science and Engineering, 58 (Aug. 2007), pp. 161-172.

Szabo, Emulsion Stability and Demulsification during the Direct Extraction of Penicillin Broth, Biotechnology and Bioengineering, 1992, pp. 247-251, vol. 40.

Zelisko, The Interaction of Proteins with Functionalized Silicones, Polymer Preprints, 2004, p. 604, vol. 45, No. 1.

Dow Corning® Crude Oil Demulsifiers, Dow Corning Product Information, Feb. 25, 2002, pp. 1-2.

Innovative Silicone Specialties, Siltech Product Brochure, 2007, pp. 1-31, Dacula, GA.

Silquat D2 Material Safety Data Sheet, Siltech Corp., Apr. 15, 2005, Siltech Corp., Toronto, Ont., Canada, pp. 1-3.

Silicone Quaternary Compounds—Silquat, Technical Bulletin of Siltech Corporation, http://www.siltechcorp.com/index.php?option=com=content&task=view&id=75&Itemid=75, Feb. 28, 2007.

Spinosad Crops, National Organic Standards Board Technical Advisory Panel Review Compiled by OMRI, Apr. 4, 2002, pp. 1-14.

Superfloc® coagulants: Liquid, Polyamine, cationic: C-500 Series, Technical Bulletin of Cytec Industries, Inc., Oct. 2005.

Technical Data Sheet Silquat® D2, Nov. 2004, 1 page, Siltech Corporation, Toronto, Ontario, Canada.

Thermo Scientific CL2 Centrifuge, Product Specification of Thermo Fisher Scientific Inc., 2008, 4 pages.

Rome, Using Silicone, Hydrocarbon Asia, May/Jun. 2001, pp. 48-49.

* cited by examiner

DEMULSIFICATION COMPOSITIONS, SYSTEMS AND METHODS FOR DEMULSIFYING AND SEPARATING AQUEOUS EMULSIONS

CROSS REFERENCE TO RELATED APPLICATIONS

This application is a divisional of U.S. patent application Ser. No. 13/603,865, filed Sep. 5, 2012, which is a divisional of U.S. patent application Ser. No. 12/417,683, filed Apr. 3, 2009, which has now issued as U.S. Pat. No. 8,268,975. Each of the above applications is incorporated herein by reference in its entirety.

BACKGROUND OF THE INVENTION

I. Field of the Invention

The present invention relates to compositions and systems comprising quaternary organopolysiloxanes that can be useful for demulsifying and separating aqueous emulsions and water-in-oil emulsions formed during processing of organic materials such as bioproducts.

II. Technical Considerations

Bioprocesses can be used to produce a wide variety of bioproducts, such as pharmaceuticals, insecticides, food additives, solvents, fuels, etc. Bioprocesses can utilize renewable feedstock sources such as corn, grain, algae, and other naturally occurring organic sources, and offer the potential for an environmentally friendly and less costly alternative to conventional synthesis routes that rely on petroleum-based feedstocks. The ability to produce a valuable end product via a biological process, using microorganisms such as bacteria, fungi, mold, etc., is proving to be a promising approach for a growing number of derived products.

Bioproducts such as antibiotic pharmaceuticals (for example penicillin) or substances obtained from microorganisms such as bacteria, algae or fungi (for example spinosyns, streptomycin, erythromycin, efrotomycin, etc.), can be produced by fermentation of a culture of microorganisms and/or enzymes in a nutrient-rich media. The bioprocess produces a bio-broth comprising a complex mixture of organic and inorganic compounds such as the valuable bioproduct, the biomass of microorganisms or enzymes, unconverted nutrient medium, fats, proteins, carbohydrates, amino acids, water and surfactant. Thus, the desired bioproduct must be extracted from the undesirable components of the bio-broth.

The separation of the selective components from bio-broths is often performed using liquid-liquid extractions. An extracting solvent, typically a water immiscible organic solvent such as amyl acetate, methyl ethyl ketone, methyl isobutyl ketone, amyl alcohol, butyl alcohol, toluene, heptane or benzyl alcohol, is added to extract the desired bioproduct from the aqueous phase to the organic phase, and the phases are separated. The broth components can form a stable emulsion as the broth and solvent are mixed which is difficult to separate by physical means, for example mechanical separation devices such as settlers, decanters and centrifuges. The resulting emulsion can occur as a dispersion of an organic phase within the aqueous phase, a dispersion of the aqueous phase within the organic phase, or both types of dispersions can be present. The dispersed material, including organics such as microorganisms, enzymes, proteins, lipids and carbohydrates, can possess a net negative charge or exhibit both polar and non-polar characteristics and be difficult to separate. These types of molecules can form hydrogen bonds with polar solvents, such as the polar aqueous phase, while having non-polar regions which can be soluble in organic solvent present in the less polar or non-polar organic phase. This results in an emulsion which is relatively stable and difficult to separate.

Nevertheless, depending on the components, some emulsions eventually break by themselves, that is, such emulsions have only "temporary stability" and over time and with the aid of gravity or centrifugation, the emulsion separates into distinct layers. More commonly, a demulsifier is added to encourage or initiate separation by gravity or centrifugation. Sodium chloride or another inorganic salt or an organic demulsifier such as AKZO D5430 quaternary fatty acid amine (commercially available from Akzo Nobel Chemical, Inc.), or KR-L255 alkylphenol-formaldehyde resin (commercially available from Kroff Chemical Co.) can be employed as a demulsifier.

Whether treated mechanically or chemically, upon separation, a solvent phase and an aqueous phase are formed. Optionally, a solid phase can be present. The solvent phase can comprise the desired bioproduct, solvent and small amounts of water and other impurities, such as organic material, the structure of which may be similar to that of the desired bioproduct and other undesirable components dissolved in the solvent. The aqueous phase can comprise the remaining components, including the biomass of the microorganisms or enzymes, and there may be a small amount of the desired bioproduct dissolved in the water and contained in the biomass. Alternatively, the desired bioproduct can be present in the aqueous phase rather than in the solvent phase.

The solvent phase may be cleaned further after separation from the aqueous phase by performing additional extractions that can include adjusting the process conditions, for example pH, temperature, or the addition of other solvents to drive the equilibrium in the desired direction to enhance the isolation of the desired bioproduct. If the addition of water forms a secondary emulsion, separation may be accomplished as described for the first emulsion. When the phase containing the desired bioproduct has been cleaned to the desired level, excess solvent or water, depending on the phase in which the bioproduct is present, can be removed by evaporation.

Conventional methods for demulsification and separation of phases have several drawbacks. For example, although inorganic salts such as sodium chloride are routinely used as demulsifiers, the phase separation can take place more slowly than desired, and the separation tends to involve a relatively large, indistinct interface, with poor segregation of components into the separate phases. For example, a significant portion of the desired bioproduct is often entrapped within cells of the biomass. As a result, recovery of the bioproduct typically has been found to be as low as 80%.

Similar emulsions also may be encountered in other bioprocessing applications, wastewater treatment or oil recovery. For example, emulsions can form during liquid extraction of plant materials (such as plant oils) from plant tissues. In crude oil production processes, water-in-oil emulsions can form in the presence of naturally occurring polar surface-active molecules such as asphaltenes and resins; fine solids such as crystallized waxes, clays and scales; steam injection; and/or high shear conditions, for example at the wellhead in the choke valve.

Use of conventional demulsifiers, such as alkylphenol-formaldehyde resins which contain phenol groups, can pose environmental concerns. Such systems are often formulated with aromatic solvents to improve the flow properties of the demulsifier, however, aromatic solvents such as benzenes, xylenes, naphtha or napthalenes also can present environmental concerns. As environmental regulations become more stringent, there is a need for more environmentally friendly or "green" demulsifiers which quickly separate phases in emulsions, provide a well-defined interface to facilitate separation and that do not require centrifugation to separate the phases of the emulsion.

SUMMARY OF THE INVENTION

In some non-limiting embodiments, the present invention provides compositions for demulsifying an emulsion comprising an aqueous phase and an organic phase, the compositions comprising at least one quaternary organopolysiloxane or salt thereof in an amount effective to at least partially separate the aqueous phase from the organic phase.

In some non-limiting embodiments, the present invention provides demulsification systems comprising: (a) an emulsion comprising an aqueous phase and an organic phase; and (b) a composition comprising at least one quaternary organopolysiloxane or salt thereof in an amount effective to at least partially separate the aqueous phase from the organic phase.

In some non-limiting embodiments, the present invention provides methods for demulsifying an emulsion comprising an aqueous phase and an organic phase, comprising (a) adding an effective amount of a composition comprising at least one quaternary organopolysiloxane or salt thereof to an emulsion comprising an aqueous phase and an organic phase.

In some non-limiting embodiments, the present invention provides methods for demulsifying an emulsion produced in bioprocessing, comprising adding an effective amount of a demulsifier to an emulsion that comprises at least one bioproduct which is desired to be extracted from the emulsion, the demulsifier comprising at least one quaternary organopolysiloxane or salt thereof.

BRIEF DESCRIPTION OF THE DRAWINGS

The foregoing summary, as well as the following detailed description, will be better understood when read in conjunction with the appended drawings. In the drawings.

DESCRIPTION OF THE INVENTION

For the purposes of this specification, unless otherwise indicated, all numbers expressing quantities of ingredients, reaction conditions, dimensions, physical characteristics, and so forth, used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all sub-ranges beginning with a minimum value equal to or greater than 1 and ending with a maximum value equal to or less than 10, and all sub-ranges in between, e.g., 1 to 6.3, or 5.5 to 10, or 2.7 to 6.1.

As used herein, "alkyl" means an aliphatic hydrocarbon group which may be straight or branched and comprising about 1 to about 20 carbon atoms in the chain. Non-limiting examples of suitable alkyl groups contain about 1 to about 18 carbon atoms in the chain, or about 1 to about 6 carbon atoms in the chain. "Branched" means that one or more lower alkyl groups such as methyl, ethyl or propyl, are attached to a linear alkyl chain. "Lower alkyl" or "short chain alkyl" means a group having about 1 to about 6 carbon atoms in the chain which may be straight or branched. Non-limiting examples of suitable alkyl groups include methyl, ethyl, n-propyl, isopropyl and t-butyl.

"Alkylene" means a difunctional group obtained by removal of a hydrogen atom from an alkyl group that is defined above. Non-limiting examples of alkylene include methylene, ethylene and propylene.

"Aryl" means an aromatic monocyclic or multicyclic ring system comprising about 6 to about 14 carbon atoms, or about 6 to about 10 carbon atoms. Non-limiting examples of suitable aryl groups include phenyl and naphthyl.

"Heteroaryl" means an aromatic monocyclic or multicyclic ring system comprising about 5 to about 14 ring atoms, or about 5 to about 10 ring atoms, in which one or more of the ring atoms is an element other than carbon, for example nitrogen, oxygen or sulfur, alone or in combination. Non-limiting examples of suitable heteroaryls include pyridyl, pyrazinyl, furanyl, thienyl, pyrimidinyl, pyridone, isoxazolyl, isothiazolyl, oxazolyl, thiazolyl, pyrazolyl, furazanyl, pyrazolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. The term "heteroaryl" also refers to partially saturated heteroaryl moieties such as, for example, tetrahydroisoquinolyl, tetrahydroquinolyl and the like.

"Halogen" or "halo" means fluorine, chlorine, bromine, or iodine. In some non-limiting embodiments, the halogen groups are fluorine, chlorine or bromine.

It should also be noted that any carbon, as well as heteroatom, with unsatisfied valences in the text, schemes, examples and Table herein is assumed to have the sufficient number of hydrogen atom(s) to satisfy the valences.

When any variable (e.g., aryl, heterocycle, R.sup.2, etc.) occurs more than one time in any constituent, its definition on each occurrence is independent of its definition at every other occurrence.

As used herein, the term "composition" is intended to encompass a product comprising the specified ingredients in the specified amounts, as well as any product which results, directly or indirectly, from the combination of the specified ingredients in the specified amounts.

As used herein, "formed from" or "prepared from" denotes open, e.g., "comprising", claim language. As such, it is intended that a composition "formed from" or "prepared from" a list of recited components be a composition comprising at least these recited components or the reaction product of at least these recited components, and can further comprise other, non-recited components, during the composition's formation or preparation.

As used herein, the term "polymer" means a substance, typically of large molecular mass, comprising structural units or monomers. Examples of polymers include oligomers, homopolymers and copolymers. The term "oligomer" means a polymer consisting of only a few monomer units up to about ten monomer units, for example a dimer, trimer or tetramer.

As used herein, "bioproduct" means a product prepared from, inter alia, an organic material. Non-limiting examples of bioproducts include pharmaceuticals, insecticides, food additives, solvents, fuels, etc. In some non-limiting embodiments, bioproducts can be produced by a biological process (bioprocess), using microorganisms such as bacteria, fungi, mold, etc. Bioprocesses can utilize renewable feedstock sources such as corn, grain, algae, and other naturally occurring organic sources.

The compositions and methods of the present invention can be useful in a wide variety of emulsion separation applications, non-limiting examples of which include bioprocessing applications such as separating bioproducts from an expended nutriment medium; preparation of organic materials such as ethanol, lactic acid, acetic acid, butanol, citric acid, glucose, and fructose; separating plant oils (such as soybean oil) from plant media or aqueous biomass; vitamin production; crude oil and natural gas production; oil reprocessing for fuel feedstock; fat, oil and grease (FOG) removal in wastewater applications; and oily waste treatment in steel mill, foundry and metal working applications.

As used herein, "emulsion" means an intimate mixture comprising two or more liquid phases, such as oil and water, wherein the liquids are mutually insoluble and where either phase may be dispersed in the other. Optionally, a solid phase can be present. A bioproduct emulsion can comprise, for example, one or more bioproducts, microorganisms, enzymes, proteins, lipids, vitamins, carbohydrates, fats, amino acids or mixtures thereof, present in two or more liquid phases. The individual components of the bioproduct emulsion can be present independently in one or more of the liquid phases.

A stable oil-in-water emulsion is a colloidal system of electrically charged oil droplets surrounded by an ionic environment. For example, in an oily waste emulsion in which oil is dispersed in a water phase, the oils can be any hydrocarbon or organic fluid, such as waste oil, lubricants, cutting fluids, heavy hydrocarbons such as tars, grease, crude oils, diesel oils, and light hydrocarbons such as gasoline, kerosene and jet fuel. The concentration of oils in the wastewater can range from a few ppm up to about 10 weight percent by volume or more.

Emulsions can be broken by chemical, physical or electrolytic means. The breaking of an emulsion to separate the components is referred to as demulsification or resolution. As used herein, "demulsifying" or "demulsification" means separating two or more components of an emulsion, such as separating an organic or oil phase from an aqueous or water phase. To break or separate an emulsion, the factors that stabilize the emulsion must be disrupted to allow the emulsified droplets to coalesce. The accumulated electric charges on the emulsified droplet can be neutralized by introducing a charge opposite to that of the droplet. The compositions of the present invention include cationic components which are capable of neutralizing negatively charged components of the emulsion, for example organic components such as microorganisms or organic matter.

While not intending to be bound by any theory, the treatment of emulsions according to the methods of the present invention is believed to comprise several steps: (1) orientation of the demulsifier at the water/solvent interface; (2) partial or complete neutralization of charged component(s) that stabilize the emulsion; (3) interference with the emulsifying properties of surface active agent(s) or other component(s) of the emulsion; and (4) rapid resolution of at least two distinct phases that are separable, for example by centrifugation, filtration or gravity.

The compositions of the present invention comprise at least one (one or more) cationic quaternary organopolysiloxanes and salts thereof. In some non-limiting embodiments, the quaternary organopolysiloxanes and salts are at least partially water soluble. As used herein with respect to the quaternary organopolysiloxanes and salts, "water soluble" means that the quaternary organopolysiloxane is capable of being at least partially or fully dissolved in water at ambient temperature (about 25.degree. C.). The solubility of a component of the compositions of the present invention, for example solubility of the quaternary organopolysiloxane, can be determined by adding 1.0 weight percent of the component to water at 25.degree. C. and mixing thoroughly (about 5 minutes) with a magnetic stirrer. The mixture is permitted to stand for 24 hours and the clarity and separation of components of the mixture is assessed by visual observation. A clear, generally haze-free solution is "water soluble", a hazy/turbid solution is "water dispersible" or "partially water soluble", and a mixture that separates into layers or has noticeable solid particulates is "water insoluble". The evaluation can be performed in the presence of up to 1.0 weight percent of a cosolvent, such as isopropyl alcohol, to aid in solubilization of the component. Alternatively, the same procedure can be performed using an organic solvent, such as toluene, instead of water to evaluate the component for lipophile solubility.

In some non-limiting embodiments, suitable quaternary organopolysiloxanes and salts thereof for use in the compositions and methods of the present invention, include those represented by the following Formulae (I) and (II):

(R—O)—CH$_2$CH(OH)CH$_2$—R'  (I)

(R—O)—C(O)CH$_2$—R'  (II)

wherein
R is wherein A is selected from the group consisting of:
a bond, —(CH$_2$CH$_2$O)$_x$—, —(CH$_2$CH(CH$_3$)O)$_y$—, and combinations thereof;
a is an integer from 0 to 200;

b is an integer from 0 to 200;
c is an integer from 1 to 200 or 1 to 100;
each R$^1$, if present, is selected from —(CH$_2$)$_n$CH$_3$ and phenyl wherein n is an integer from 0 to 32 or 0 to 10;
each R$^2$, if present, is —(CH$_2$)$_3$—(OCH$_2$CH$_2$)$_x$—(OCH$_2$CH(CH$_3$))$_y$—(OCH$_2$CH$_2$)$_z$—OH;
R' is selected from:

(a)

wherein R$^3$, R$^4$, and R$^5$ are each independently alkyl having from 1 to 22 carbon atoms, or 1 to 20 carbon atoms, and X is an ion selected from the group consisting of Cl, Br, CH$_3$SO$_4$ and CH$_3$CH$_2$SO$_4$;

(b)

wherein R$^6$ is alkyl having from 6 to 22 carbon atoms, or 6 to 20 carbon atoms; R$^7$ and R$^8$ are independently selected from the group consisting of methyl and ethyl; and n is an integer from 1 to 5, and X is an ion selected from the group consisting of Cl, Br, CH$_3$SO$_4$ and CH$_3$CH$_2$SO$_4$; and (c)

wherein R$^9$ is alkyl having from 6 to 22 carbon atoms, or 6 to 20 carbon atoms; and v is an integer from 1 to 5, and X is an ion selected from the group consisting of Cl, Br, CH$_3$SO$_4$ and CH$_3$CH$_2$SO$_4$; and
each x, y and z is an independently selected integer each ranging from 0 to 22, or 0 to 20, and in some embodiments the sum of x, y and z is at least 1.

In some non-limiting embodiments, X$^-$ is Cl$^-$.

In some non-limiting embodiments, R is wherein x, y and z are integers and are each independently selected from 0 to 20, and a, b, c, R$^1$ and R$^2$ are as set forth above.

Non-limiting examples of polymers of Formulae (I) and (II) and methods for making the polymers are disclosed in U.S. Pat. Nos. 5,098,979 and 5,153,294, each incorporated by reference herein. The polymers of Formulae (I) and (II) can be prepared by reaction of a hydroxyl containing silicone polymer with a suitable halohydrin (such as epichlorohydrin or epibromohydrin) or halo acid (such as chloracetic acid). One method of preparing the reactive hydroxyl containing silicone polymer is to react silanic hydrogen containing polymer with allyl alcohol or allyl alcohol alkoxylate monomer in a manner well known to those skilled in the art, for example as is disclosed in U.S. Pat. No. 4,083,856. In some embodiments, the hydroxy containing silicone polymer can be alkoxylated with ethylene oxide, propylene oxide or mixtures thereof. The type of alkylene oxide and amount present in the silicone polymer results in a series of products ranging in water/oil solubility.

In some non-limiting embodiments, suitable quaternary organopolysiloxanes and salts thereof for use in the compositions and methods of the present invention include those represented by Formula (III):

wherein a, b, c, $R^1$ and $R^2$ are each as set forth above, b is at least 1, and R is an alkyl group having 1 to 24 carbon atoms, or 1 to 6 carbon atoms.

In some non-limiting embodiments, suitable quaternary organopolysiloxanes and salts thereof of Formula (III) include those represented by the following Formula (IIIa):

(IIIa)

wherein a, b and R are as discussed above for Formula (III).

In some non-limiting embodiments, suitable quaternary organopolysiloxanes and salts thereof for use in the compositions and methods of the present invention include those represented by the following Formula (IV):

(IV)

wherein a is an integer from 0 to 200; and A and R' are as set forth above.

In some non-limiting embodiments, suitable quaternary organopolysiloxanes and salts thereof of Formula (IV) include those represented by the following Formula (IVa):

(IVa)

wherein a is an integer from 0 to 200 and R is an alkyl group having 1 to 24 carbon atoms, or 1 to 6 carbon atoms.

Non-limiting examples of quaternary organopolysiloxanes and salts of Formulae (III) and (IV) include KR-DP0319, KR-DP0320, KR-DP0324, KR-DP0325, and KR-DPO470 water soluble quaternary organopolysiloxanes in solvent; and KR-DP0326, KR-DPO460, and KR-DP0471 water insoluble quaternary organopolysiloxanes in solvent, commercially available from Kroff Chemical Co., Inc. of Pittsburgh, Pa.

In some non-limiting embodiments, suitable quaternary organopolysiloxanes and salts can be represented by Formula (V) (also referred to as silicone polyether fatty quats):

(V)

wherein R is an alkyl group having from 4 to 22 carbon atoms. In some embodiments, R can be the residue of a fatty acid group, such as an alkyl group having from 4 to 22 carbon atoms, or 4 to 20 carbon atoms, or 4 to 18 carbon atoms, or 4 to 12 carbon atoms.

Non-limiting examples of suitable quaternary organopolysiloxanes and salts of Formula (V) include KR-DP0327 and KR-DP-0453 water soluble cationic quaternary polyether fatty amide organopolysiloxanes in solvent, commercially available from Kroff Chemical Co. The compounds contain a fatty portion which is derived from a fatty amine. Incorporation of this type of group into the silicone molecule results in increased solubility in many organic solvents. The fatty portion of the amine can be derived from any fatty acid, for example having from 4 to 24 carbon atoms such as stearic acid or oleic acid.

In some non-limiting embodiments, the quaternary organopolysiloxane(s) or salt(s) comprises up to about 100 weight percent of the composition, or about 5 to about 100 weight percent, or about 10 to about 30 weight percent or about 20 weight percent based upon the weight of (1) quaternary organopolysiloxane or salt and (2) quaternary epihalohydrin/polyamine copolymer (if present), and/or p(DADMAC) (if present) in the composition (e.g., not including solvent or carrier such as water).

In some embodiments, such as the Kroff products discussed above, the quaternary organopolysiloxane or salt thereof is present with at least one solvent. Non-limiting examples of suitable solvents include glycols such as ethylene glycol, propylene glycol, hexylene glycol, diethylene glycol, polyglycols such as polyethylene glycol and polypropylene glycol, polyols such as glycerol (glycerine) and short chain aliphatic alcohols such as methanol, ethanol and isopropyl alcohol, and mixtures thereof. The amount of solvent can range from about 10 to about 100 weight percent, or about 55 to about 90 weight percent, or about 70 to about 75 weight percent, based upon total weight of the organopolysiloxane and solvent. Quaternary polysiloxanes tend to be very viscous and generally require a solvent to improve their handling properties. In general, it is commercially desirable to limit the solvent content to a minimum that will provide the desired viscosity property of the product.

In some non-limiting embodiments, the compositions of the present invention comprise at least one cationic quaternary epihalohydrin/polyamine polymer or salt thereof. Suitable epihalohydrin/polyamine polymers can be prepared by the polymerization of at least one epihalohydrin, at least one alkylene diamine and at least one alkylene polyamine in which at least some of the nitrogen atoms of the copolymer have been quaternized. The quaternary epihalohydrin/polyamine polymer comprises or consists essentially of the following repeating units:

wherein R and $R^2$ are each independently selected from alkyl groups having 1 to 3 carbon atoms; E is the residue obtained after bifunctional reaction of a compound selected from the group consisting of epihalohydrins (such as epichlorohydrin or epibromohydrin), diepoxides (such as 1,4-butanediol-diglycidyl ether), precursors thereof and mixtures thereof; and A is the residue obtained after reaction of a polyfunctional polyamine selected from the group consisting of ammonia, primary amines, alkylene diamines of 2 to 6 carbon atoms, polyalkylpolyamines of the structure:

wherein y represents an integer of about 1 to 5, $R_3$ is an alkylene radical of about 2 to 6 carbon atoms, and $R_4$ is selected from the group consisting of hydrogen, alkyl of about 1 to 3 carbon atoms, and ω-aminoalkyls of about 2 to 6 carbon atoms, a polyglycolamine, for example having the structure:

wherein x is an integer of about 1 to 5; piperazine heteroaryl diamines or aryl diamines.

$X^-$ is an ion forming the anionic portion of the polyquaternary compound, m to p are integers which represent the molar quantities of amine reactants, the ratio of m to p being from 99:1 to 85:15; n represents the molar quantity of E forming the principal chain of the polyquaternary, the molar quantity represented by n being substantially equal to the sum of the molar quantities of m and p; the polyfunctional amine containing, in addition to the amount of E required for difunctional reaction therewith, an amount of E which is from zero to about the full functional equivalency remaining in A, the sum of m, n and p being such as to provide a polyquaternary compound which as a 37% aqueous solution, by weight, based on the total weight of the cationic portion of the polyquaternary compound has a viscosity at 25° C. of at least 10 centistokes; and z is an integer such as to satisfy anion requirements of the polyquaternary compound. Non-limiting examples of such quaternary epihalohydrin/polyamine polymers and processes for making the same are set forth in U.S. Pat. No. 3,738,945, incorporated by reference herein.

In some non-limiting embodiments, the quaternary epihalohydrin/polyamine polymer and salts thereof are condensation polymerization reaction products having a branched structure comprising or consisting essentially of the following repeating units:

wherein each of $R^1$, $R^2$, $R^3$ and $R^4$ are independently selected from hydrogen or and wherein x ranges from about 50 to about 200, y ranges from 0 to about 10 and z ranges from about 50 to about 200.

In some embodiments, suitable quaternary epihalohydrin/polyamine polymers and salts thereof include liquid quaternary epihalohydrin/polyamine polymer solutions in water, such as those having C.A.S. Registry No. 42751-79-1. Non-limiting examples of liquid quaternary epihalohydrin/polyamine polymer solutions in water include for example KR-C1620, KR-C1630, KR-C1650 and KR-C1680 liquid polyamine solutions, commercially available from Kroff Chemical Co. In other embodiments, the quaternary epihalohydrin/polyamine polymer can have the C.A.S. Registry No. 25988-97-0.

In some embodiments, it is preferred that the quaternary epihalohydrin/polyamine polymer be NSF and/or GRAS approved for use in products for consumption by or application to humans. GRAS standards for such materials are set forth in §21 C.F.R. 570.30-570.35. The quaternary epihalohydrin/polyamine polymer can be present in a carrier or diluent, such as water. The amount of carrier can range from about 40 to about 70 weight percent, or about 45 to about 55 weight percent, or about 50 weight percent, based upon total weight of the quaternary epihalohydrin/polyamine polymer and carrier.

In some embodiments, the quaternary epihalohydrin/polyamine polymers have a weight average molecular weight of less than about 2,000,000 grams/mole, or less than about 1,000,000 grams/mole, or about 20,000 to about 300,000 grams/mole.

In some embodiments, the quaternary epihalohydrin/polyamine copolymer comprises up to about 95 weight percent of the composition, or about 5 to about 95 weight percent, or about 70 to about 90 weight percent or about 80 weight percent based upon the weight of (1) quaternary organopolysiloxanes and (2) quaternary epihalohydrin/polyamine copolymers, and/or p(DADMAC) (if present) in the composition (e.g., not including solvent or carrier such as water).

In some non-limiting embodiments, the compositions of the present invention comprise one or more (poly)diallyldimethylammonium halides such as diallyldimethylammonium chloride polymer (known as "p(DADMAC)", "p(DMDAAC)" or "p(DADM)"). Methods for preparing p(DADMAC)s are disclosed in U.S. Pat. Nos. 4,092,467 and 4,151,202, each incorporated by reference herein. Poly-dialkyldiallyl ammonium chloride, which is a polymer of dialkyldiallyl ammonium chloride and may be written poly-(dialkyldiallyl ammonium chloride), typically has a molecular weight of from about 10,000 to about 2,000,000 or more, and is discussed in U.S. Pat. No. 3,782,546, incorporated by reference herein. Commercially available dimethyldiallyl ammonium chloride and polydimethyldiallyl ammonium chloride generally contain a mixture of mono and diallyl forms. Poly-dialkyldiallyl ammonium salts may be prepared by any of a number of known techniques. U.S. Pat. No. 3,782,546 identifies several U.S. patents which discuss the preparation and use of poly-dialkyldiallyl ammonium chlorides. Non-limiting examples of suitable p(DADMAC)s include KR-C2320, KR-C2370, KR-C2553, KR-C2570 and KR-C2623, available from Kroff Chemical Co.

In some embodiments, the p(DADMAC) comprises up to about 95 weight percent of the composition, or about 5 to about 95 weight percent, or about 70 to about 90 weight percent or about 80 weight percent based upon the weight of (1) quaternary organopolysiloxanes or salts and (2) quaternary epihalohydrin/polyamine copolymers or salts (if present), and/or p(DADMAC) in the composition (e.g., not including solvent or carrier such as water).

The degree of quaternization of the quaternary organopolysiloxane, quaternary epihalohydrin/polyamine copolymer, and/or p(DADMAC) can be from about 25% to about 100%, or about 70% to about 90%, or about 75%, based on the number of nitrogen atoms quaternized. Thus, some or all of the nitrogen atoms of the above compounds or polymers may be quaternized. The quaternization product may be used directly as a demulsifier for resolving emulsions produced in preparation of pharmaceuticals by fermentation or in diluted form, such as an aqueous solution, for demulsification. Alternatively, the conjugate acid salts thereof may be used directly or in similar diluted form. Such salts may be formed by addition of an acid, such as hydrochloric acid, to the quaternized oxyalkylated amine.

The composition comprises quaternary organopolysiloxane(s) or salt(s), and in some embodiments can further comprise one or more of quaternary epihalohydrin/polyamine copolymer(s) or salt(s), and/or p(DADMAC). The quaternary organopolysiloxane(s) or salt(s), quaternary epihalohydrin/polyamine copolymer(s) or salt(s), and/or p(DADMAC) can be premixed prior to mixing with the emulsion, or added separately or sequentially in any order desired.

In some embodiments, other additives can be included in compositions of the present invention. Non-limiting examples of such additives include other demulsifiers that are chemically different from the demulsifiers discussed above (for example having at least one different atom or different molecular arrangement), surfactants or wetting agents such as nonionic or cationic surfactants, nonionic polysiloxanes, compatibilizers and coupling agents. Non-limiting examples of suitable additives include fatty amines such as ARMEEN® fatty amines commercially available from Akzo Nobel Surfactants, fatty amine polyglycol ethers, quaternary ammonium salts, oxyalkylated phenolic resins, alkoxylated alkylphenol formaldehyde resins, ethylene oxide/propylene oxide copolymers, polyoxyalkylene glycols, polyalkylene glycols, silicone polyethers, nonionic polysiloxanes such as Dow DM-2 polydimethylsiloxane or mixtures thereof. Non-limiting examples of suitable compatibilizers include low molecular weight alcohols such as butyl carbitol and phosphate esters.

Such additives can be present in an amount such that the additive comprises less than about 30 percent by weight, or less than about 15 percent by weight, or less than about 5 percent by weight, or less than about 3 percent by weight, based on the total weight of the composition. In some non-limiting embodiments, the aforementioned optional additives can be pre-mixed with the quaternary organopolysiloxane (and quaternary epihalohydrin/polyamine copolymer(s) or salt(s), and/or p(DADMAC)), if present, before being added to the emulsion, or the components can be added simultaneously or sequentially in any order desired.

The compositions of the present invention can be useful as demulsifiers in resolving emulsions. Non-limiting examples of such emulsions include those produced in preparation of bioproducts such an antibiotics, for example, penicillin or substances obtained from fungus (spinosads, streptomycin, erythromycin, efrotomycin, etc.), by fermentation in which a culture of microorganisms or enzymes in a nutriment medium, such as vegetable oil in a water base, ferments to produce a desired bioproduct. The emulsion can comprise one or more bioproducts, microorganisms, enzymes, proteins, lipids, vitamins, carbohydrates, fats, amino acids, organic solvents, emulsifiers, nutrient from the nutriment medium, particulate matter including enzymes or microorganisms, and various organic or inorganic compounds such as electrolytes, trace minerals and/or buffering agents. Such emulsions are produced in a broad range of pHs and the components are present in a variety of relative proportions.

In some embodiments, the emulsion can comprise fermentation products such as A83543 family of compounds, referred to as spinosyns, that are produced by certain strains of *Saccharopolyspora spinosa*. The previously disclosed naturally produced spinosyns have a 5,6,5-tricylic ring system, fused to a 12-membered macrocyclic lactone, a neutral sugar (rhamnose) and an amino sugar (forosamine). The known spinosyns have been referred to as factors or components, and each has been given an identifying letter designation, i.e., spinosyn A, B, etc. The compounds are useful for the control of arachnids, nematodes and insects, in particular Lepidoptera and Diptera species, are environmentally friendly and have a good toxicological profile. U.S. Pat. No. 5,362,634 discloses spinosyns A, B, C, D, E, F, G, H, and J. WO 93/09126 discloses spinosyns L, M, N, Q, R, S, and T. WO 94/20518 discloses spinosyns K, 0, P, U, V, W, and Y, and derivatives thereof. Other spinosyn compounds include those disclosed in WO 97/00265, and U.S. Pat. No. 6,455,504 (*Saccharopolyspora* species designated LW107129 (NRRL 30141)). Each of these U.S. Patents and PCT WO publications is incorporated by reference herein.

Spinosyns are fermentation products produced by chemical mutants of actinomycetes soil bacterium *Saccharopolyspora spinosa*. The bacterium can be grown aerobically in an aqueous growth medium to produce biologically active metabolites called spinosyns. The aqueous growth medium can contain components such as proteins, carbohydrates, oils, and minerals, for example corn solids, cottonseed flour, soybean flour, glucose, methyl oleate and calcium carbonate. "Spinosad Crops", National Organic Standards Board Technical Advisory Panel Review (Apr. 4, 2002), incorporated by reference herein. The spinosad fraction (about 85% spinosyn A and 15% spinosyn D) is soluble in organic solvents such as methanol and can be extracted from the biomass by centrifugation or filtering to remove solids, concentration by evaporation, conversion to salt by mixing with acidified water, and crystallized from the water by adding base to neutralize the solution. Spinosad Crops at page 1.

Similar emulsions, which also can be treated with the demulsifiers of this invention, may be the result of other bioprocessing applications, wastewater treatment, and oil recovery. Wastewater treatment can involve separating waste oil, lubricants and/or greases from industrial oily wastewater which include oil, dispersed solids and emulsified water, such as are produced in chemical processing, steel and aluminum industries, automotive industry, cotton and wool manufacturing processes, laundry industry and the refinery industry. Emulsified oil in wastewater is typically present in amounts of about several hundred to tens of thousands of ppm or more. The United States Environmental Protection Agency (EPA) and local governments have placed limits on the amount of oil and grease in water to be discharged into public drinking water supplies or waterways.

The compositions of the present invention can be environmentally desirable compared to conventional demulsifiers, such as alkylphenol-formaldehyde resins which can contain phenols.

The demulsifiers of the present invention can be remarkably fast acting, with application of a very small amount of the demulsifier producing a nearly immediate phase separation with an exceptionally clear, well-defined interface, and almost all of the desired product or bioproduct segregated into one distinct phase. As used herein, "interface level" means the surface between two immiscible phases determined by visual observation, as evidenced by different physical properties between the phases, for example different colors, different opacity, different turbidity, and/or different densities between the phases. The interface level can be determined by stirring an emulsion including demulsifier for about 5 minutes with a magnetic stirrer, then homogenizing using a high shear Turran mixer until a stable emulsion is formed. The emulsion is then stirred for about 15 minutes to verify the stability of the emulsion. A 10 ml sample of homogenized emulsion is placed in a conventional 15 ml conical centrifuge tube, placed in a centrifuge and spun down, generally for about 5 minutes at 3100 rpm. An example of a suitable centrifuge is an IEC Centra CL2 centrifuge which is available from Thermo Fisher Scientific, Inc. The measured phase separation results are normalized to a starting value of 10 ml and compared to the phase separations measured using the same process and bio-broth, but without the addition of the demulsifying agent. The interface level is measured as the visual boundary between the top layer (generally the solvent layer) and any material below the top layer (such as water, solids, and any unseparated solvent/water (rag layer)).

The amount of demulsifier used to treat the emulsion is an amount effective to at least partially separate an aqueous phase of the emulsion from an organic phase of the emulsion, and in some non-limiting embodiments can range from about 1 to about 200,000 ppm or more, or about 10 to about 50,000 ppm, or about 50 to about 50,000 ppm, or about 100 to about 20,000 ppm, or about 100 to about 10,000 ppm, or about 500 to about 10,000 ppm, or about 1,000 to about 5,000 ppm based upon the amount of emulsion to be treated. In some non-limiting embodiments, the amount of demulsifier can range from about 1 to about 200,000 or more microliters (µl) per liter of emulsion to be treated, or about 10 to about 50,000 µl/l, or about 50 to about 50,000 µl/l, or about 100 to about 20,000 µl/l, or about 100 to about 10,000 pill, or about 500 to about 10,000 µl/l, or about 1,000 to about 5,000 µl/l. The optimal proportion depends on the particular emulsion being treated. Such emulsions typically comprise about 2% by weight to about 75% by weight, often about 50% by weight water. Typically, some such emulsions have first been neutralized to a pH of from about 7 to about 7.4. However, other emulsions have other pHs, and it has been found that the demulsifiers of this invention are applicable over a wide pH range—at least from about 3 to about 11. If desired, the demulsifier may be mixed into the emulsion by shaking or stirring.

More specifically, upon application of a demulsifier of this invention to such emulsions, the emulsion usually separates immediately into distinct phases with a sharp, well-defined interface, and particulate matter in the emulsion being treated is sequestered into the aqueous phase. The phase separation can be essentially complete, with little or no residual emulsion remaining. Where the desired pharmaceutical or component resides is dependent on where and how the manufacturer manipulates the pH. For example, pH adjustment may cause the desired component to collect in the water phase, while a different pH adjustment may cause the desired component to collect in the organic phase.

In some non-limiting embodiments, the compositions and methods of the present invention can be used to separate bioproducts or pharmaceuticals, such as penicillin, from fermentation products or bio-broths.

In other non-limiting embodiments, the compositions and methods of the present invention can be used to separate plant oils which are dispersed in an aqueous biomass.

In some non-limiting embodiments, the compositions of the present invention can be used as demulsifiers in an effective amount to reduce or eliminate the need for centrifugation, which can significantly reduce processing, equipment costs and processing time. An effective amount to eliminate centrifugation can be about 25% to about 50% more than the amounts required for centrifugation, and can be the amounts of about 1 to about 200,000 ppm or more listed above, based upon the amount of emulsion to be treated.

The compositions of the present invention can include carrier solvents such as water, hexylene glycol, propylene glycol and isopropyl alcohol, which are more environmentally friendly and less volatile than carrier solvents typically used for commercially available demulsifiers, such as benzene, diethyl benzene, trimethyl benzene, xylenes, naphtha or naphthalenes.

In some non-limiting embodiments, the present invention provides methods for demulsifying an emulsion comprising an aqueous phase and an organic phase, comprising (a) adding an effective amount of a composition comprising at least one cationic quaternary organopolysiloxane or salt thereof, optionally with at least one quaternary epihalohydrin/polyamine copolymer, or optionally with at least one polydimethyldiallyl ammonium chloride polymer, to an emulsion comprising an aqueous phase and an organic phase. The aqueous phase and organic phase can be separated as discussed above, for example by gravity, centrifugation, etc.

In some embodiments, the present invention provides methods for demulsifying an emulsion produced in bioprocessing, comprising adding an effective amount of a demulsifier to an emulsion that comprises at least one bioproduct which is desired to be extracted from the emulsion, the demulsifier comprising at least one quaternary organopolysiloxane or salt thereof, optionally with at least one quaternary epihalohydrin/polyamine copolymer, and/or optionally with at least one polydimethyldiallyl ammonium chloride polymer as discussed above.

The invention will be further described by reference to the following examples. Unless otherwise indicated, all parts and percentages are by weight.

EXAMPLES

Example 1

The phase separation of an emulsion including S. Spinosa fermentation broth with di-isobutyl ketone as extraction solvent was evaluated using demulsifying compositions of the present invention including either a cationic quaternary organopolysiloxane salt or a mixture of the cationic quaternary organopolysiloxane salt with a quaternary epihalohydrin/polyamine copolymer. Hexylene glycol, water and blends thereof were used as the carrier solvent for the demulsifying composition. The fermentation broths used in the examples below comprised various proteins from natural sources, carbohydrates, lipids, trace minerals and/or electrolytes for pH buffering.

The fermentation broth was adjusted with ammonium hydroxide to an alkaline value of approximately pH 9.8. The pH-adjusted fermentation broth was mixed with di-isobutyl ketone solvent at a ratio of 2 parts bio-broth to 3 parts solvent. To this mixture, a predetermined amount of a demulsifying composition of the present invention including either a quaternary organopolysiloxane salt or a mixture of a quaternary organopolysiloxane salt with a quaternary epihalohydrin/polyamine copolymer was added. For comparison, a Control composition was prepared using the same components as the demulsifying composition, except without the quaternary organopolysiloxane salt and quaternary epihalohydrin/polyamine copolymer. The components of each demulsifier composition are set forth in Table 1 and Table 2 below.

TABLE 1

| Product | Demulsifier (weight %) | Solvent (weight %) |
|---------|------------------------|---------------------|
| KR-DP0320 | 70% quaternary organopolysiloxane salt, molecular weight ~26000 | 30% Hexylene Glycol |
| KR-DP0356 | 70% quaternary organopolysiloxane salt, molecular weight ~2600 | 30% Propylene Glycol |
| KR-DP0319 | 70% quaternary organopolysiloxane salt, molecular weight ~500 | 30% Hexylene Glycol |
| KR-DP0324 | 70% quaternary organopolysiloxane salt, molecular weight ~4300 | 30% Hexylene Glycol |
| KR-C1630 | 50% quaternary epihalohydrin/polyamine copolymer, molecular weight ~33,000 | 50% Water |
| KR-C2570 | 40% polydimethyldiallyl ammonium chloride, molecular weight ~250,000 | 60% Water |

TABLE 2

| Composition # | (wt. %) | Component #1 | (wt. %) | Component #2 |
|---------------|---------|--------------|---------|--------------|
| 1 | 100 | KR-DP0320 | 0 | |
| 2 | 100 | KR-C1630 | 0 | |
| 3 | 100 | KR-C2570 | 0 | |
| 4 | 75 | KR-DP0320 | 25 | KR-C1630 |
| 5 | 50 | KR-DP0320 | 50 | KR-C1630 |
| 6 | 25 | KR-DP0320 | 75 | KR-C1630 |
| 7 | 50 | KR-DP0320 | 50 | KR-C2570 |

The resulting mixture was stirred with a magnetic stirrer for approximately 5 minutes. The mixture was then homogenized using a high shear Turrax mixer until a stable emulsion was formed. This emulsion was then stirred for approximately 15 minutes to verify the stability of the emulsion.

A 10 ml sample of each emulsion was taken and placed into a conventional 15 ml conical centrifuge tube and spun down in a centrifuge at 3100 rpm, measuring the phase separation at predetermined time intervals. The centrifuge was an IEC Centra CL2 centrifuge available from Thermo Fisher Scientific, Inc. For the intent of these Examples, 5 minutes represented the maximum practical time for centrifugation; phase separation is essentially completed for the test condition and minimal further phase separation is anticipated beyond 5 minutes. The measured phase separation results were than normalized to a starting value of 10 ml and compared to the phase separations measured using the same process and fermentation broth, but without the addition of the de-emulsifying agent. This comparison was made to show that the quaternary organopolysiloxane salt and quaternary epihalohydrin polyamine copolymer enhanced the phase separation rate. This experiment was repeated numerous times using different production runs of the fermentation broth and varying dosage levels of the cationic siloxane.

Figure 1:
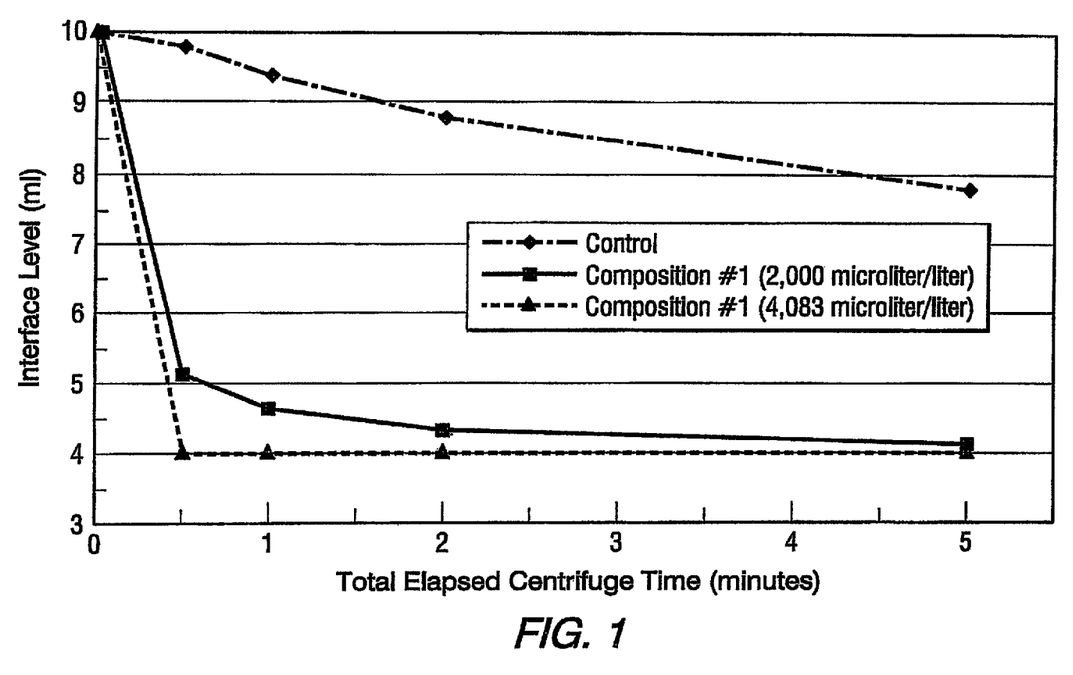
FIG. 1 is a graph of phase separation as a function of total elapsed centrifuging time for a S. Spinosa fermentation broth using di-isobutyl ketone as extraction solvent, and a demulsifying composition including hexylene glycol carrier solvent and a quaternary organopolysiloxane salt according to the present invention compared to a similar demulsifying composition without the cationic quaternary organopolysiloxane salt.

FIG. 1 is a graph of phase separation as a function of total elapsed centrifuging time for a S. Spinosa fermentation broth using di-isobutyl ketone as extraction solvent, and a demulsifying composition (Composition #1) according to the present invention compared to a similar demulsifying composition without the quaternary organopolysiloxane salt (Control). On the scale, a 4.0 ml interface reading was considered to be essentially complete separation.

As shown in FIG. 1, Composition #1 provided faster and more complete phase separation compared to the Control, which did not contain a quaternary organopolysiloxane salt. Also, the rate and completeness of the separation improved with increased dosage of the quaternary organopolysiloxane salt.

Figure 2:
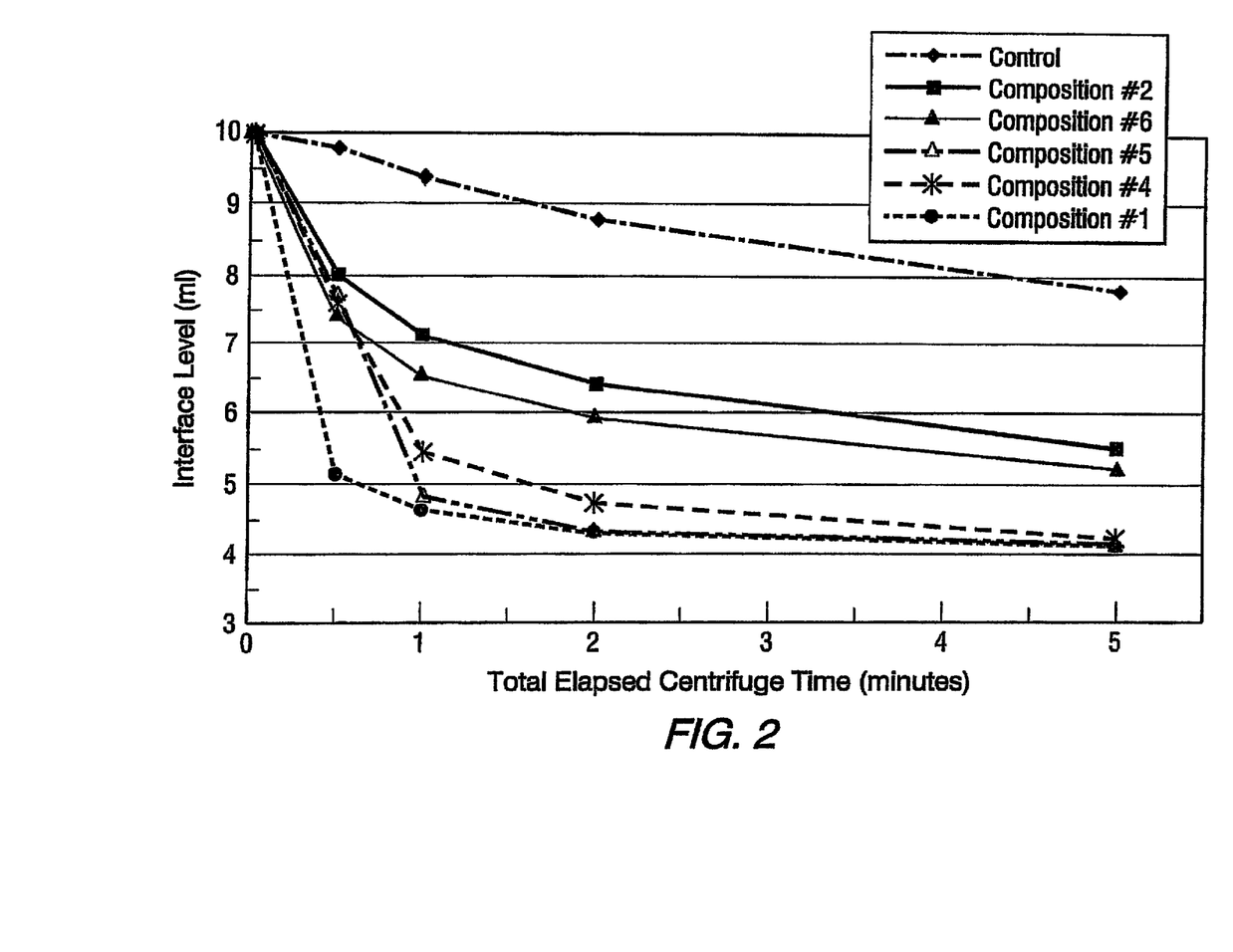
FIG. 2 is a graph of phase separation as a function of total elapsed centrifuging time for a S. Spinosa fermentation broth using di-isobutyl ketone as extraction solvent, and a demulsifying composition including hexylene glycol and/or water as a carrier solvent and a quaternary organopolysiloxane salt and a similar demulsifying composition including a quaternary organopolysiloxane salt and a quaternary epihalohydrin/polyamine copolymer, according to the present invention.

FIG. 2 is a graph of the phase separation as a function of total elapsed centrifuging time for a *S. Spinosa* fermentation broth using di-isobutyl ketone as extraction solvent, and demulsifying compositions containing a quaternary organopolysiloxane salt and a quaternary epihalohydrin polyamine copolymer, according to Table 2. A demulsifier dosage of 2,000 μl demulsifier composition per liter of broth was used in these tests.

As shown in FIG. 2, Compositions #4, 5, & 6, provided faster and more complete phase separation compared to the similar Control and to the broth treated with Composition #2 which did not contain a quaternary organopolysiloxane salt.

Example 2

Figure 3:
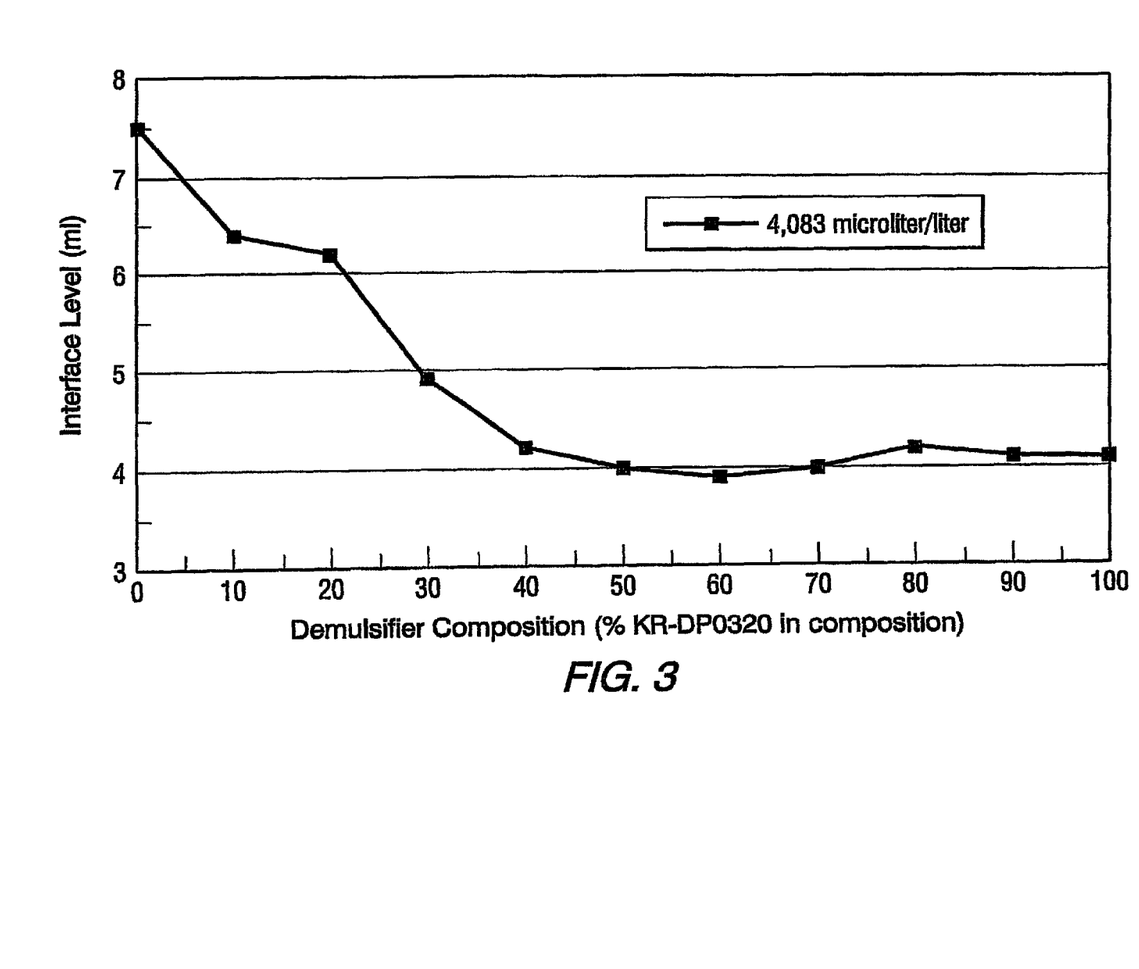
FIG. 3 is a graph of phase separation at 1 minute elapsed centrifuging time for a S. Spinosa fermentation broth using di-isobutyl ketone as extraction solvent, and demulsifying compositions including a solvent mixture of hexylene glycol and water and a varying ratio of quaternary organopolysiloxane salt to quaternary epihalohydrin/polyamine copolymer, as described in Table 3, according to the present invention.

The phase separation of a *S. Spinosa* fermentation broth with di-isobutyl ketone as extraction solvent was evaluated using the same procedure described in Example 1. Demulsifying compositions of the present invention including a mixture or blend of KR-DP0320 quaternary organopolysiloxane salt, with KR-C1620 quaternary epihalohydrin/polyamine copolymer composition. The interface levels after 1 minute of centrifugation for various blend ratios are compiled in Table 3 and FIG. 3. The compositions containing a quaternary organopolysiloxane salt demonstrated a faster separation rate and improved completeness of phase separation. The quaternary epihalohydrin polyamine alone exhibited limited demulsification performance on the *S. Spinosa* broth, whereas addition of the quaternary organopolysiloxane salt markedly improved the separation efficiency of the demulsifier.

TABLE 3

| Demulsifier composition | | Interface Level (ml) |
|---|---|---|
| KR-DP0320 (wt %) | KR-C1630 (wt %) | Dosage = 4083 μl of demulsifier composition per liter of broth |
| 0 | 100 | 7.5 |
| 10 | 90 | 6.4 |
| 20 | 80 | 6.2 |
| 30 | 70 | 4.9 |
| 40 | 60 | 4.2 |
| 50 | 50 | 4.0 |
| 60 | 40 | 3.9 |
| 70 | 30 | 4.0 |
| 80 | 20 | 4.2 |
| 90 | 10 | 4.1 |
| 100 | 0 | 4.1 |

Example 3

The phase separation of a *S. Spinosa* fermentation broth with di-isobutyl ketone as extraction solvent was evaluated using the same procedure described in Example 1. Demulsifying compositions of the present invention included a mixture or blend of a quaternary organopolysiloxane salt with either a quaternary epihalohydrin polyamine or a p(DADMAC). The interface levels after 1 minute of centrifugation for various blend ratios are compiled in Table 4. The compositions containing a quaternary organopolysiloxane salt demonstrated a faster separation rate and improved completeness of phase separation. Either a quaternary epihalohydrin polyamine or a p(DADMAC) alone exhibited limited demulsification performance on the *S. Spinosa* broth, whereas addition of a quaternary organopolysiloxane salt markedly improved the separation efficiency of the demulsifier.

TABLE 4

| | Dosage in μl of Demulsifier Composition per liter of broth Demulsifier Composition | | | |
|---|---|---|---|---|
| | 2000 | 4083 | 6258 | 8534 |
| | | Interface Level (ml) | | |
| #2 | 7.1 | 7.5 | 7.1 | 6.6 |
| #3 | 7.1 | 8.3 | 7.6 | 7.7 |
| #5 | 4.9 | 4.0 | 3.8 | — |
| #7 | 5.9 | 3.9 | 3.9 | — |
| #1 | 4.7 | 4.1 | 4.0 | 4.0 |

Example 4

The phase separation of a *S. Spinosa* fermentation broth with di-isobutyl ketone as extraction solvent was evaluated using the same procedure described in Example 1. Demulsifying compositions of the present invention included a blend of KR-DP0356, a quaternary organopolysiloxane salt, with, KR-C1630, a quaternary epihalohydrin polyamine copolymer. Propylene glycol and water were the carrier solvents for the demulsifying composition. The interface level after 1 minute of centrifugation for various treatment rates is compiled in Table 6. The composition components and amounts are as set forth in Tables 5 and 6 below.

TABLE 5

| Composition # | (wt. %) | Component #1 | (wt. %) | Component #2 |
|---|---|---|---|---|
| 8 | 20 | KR-DP0356 | 80 | KR-C1630 |

TABLE 6

| Composition #8 Dosage (μl of demulsifier composition per liter of broth) | Interface Level (ml) after 1 minute | Interface Level (ml) after 5 minutes |
|---|---|---|
| 500 | 9.4 | 7.2 |
| 1021 | 8.9 | 7.2 |
| 1565 | 7.5 | 6.2 |
| 2134 | 6.7 | 5.3 |
| 2730 | 6.0 | 4.8 |
| 3357 | 5.7 | 4.6 |
| 4612 | 4.4 | 4.3 |
| 5866 | 4.2 | 4.1 |

As shown in Table 6, varying amounts of a fixed blend of quaternary organopolysiloxane salt and quaternary epihalohydrin/polyamine copolymer according to the present invention provided good phase separation. As the dosage was increased, the rate of phase separation increased and the completeness of phase separation improved.

Example 5

The phase separation of a *Saccharomyces cerevisiae* yeast fermentation bio-broth using toluene as the extraction solvent was evaluated. This bio-broth was mixed with toluene at a ratio of 1 part broth to 1 part solvent. The demulsifying composition of the present invention contained KR-DP0320 quaternary organopolysiloxane salt and a carrier solvent, hexylene glycol. The amount of demulsifier added to the bio-broth was 4830 μl of demulsifier composition per liter of broth. The bio-broth was separated using the same procedure as in Example 1 above. The results are as set forth in Table 7 below. On the scale, 5.0 ml phase separation was considered to be essentially complete separation.

TABLE 7

| | Interface Level (ml) after Specified Centrifuge Time | |
|---|---|---|
| Time | Control | KR-DP0320 4830 µl of demulsifier composition per liter of broth |
| 0.5 minutes | 10.0 mls | 5.1 mls |
| 1.0 minutes | 8.1 mls | 5.0 mls |
| 2.0 minutes | 7.2 mls | 4.95 mls |
| 5.0 minutes | 6.3 mls | 4.95 mls |

As shown in Table 6, the quaternary organopolysiloxane salt provided a significantly enhanced rate of separation and a higher degree of separation when compared to the untreated Control.

Example 6

The phase separation of a bio-broth consisting of a beef extract with peptones using toluene as the extraction solvent was evaluated. The bio-broth was a biologically based material with a very high protein content which acts as an emulsion stabilizer in aqueous/organic systems. The concentration of the broth was approximately 10% beef extract and peptones by weight with the remaining being de-ionized water. This bio-broth was mixed with toluene solvent at a ratio of 13 parts broth to 20 parts toluene. A demulsifying composition of the present invention containing KR-DP0320 quaternary organopolysiloxane salt and hexylene glycol carrier solvent, was added at a dosage rate of 3,000 microliters of quaternary organopolysiloxane salt composition per liter of bio-broth. The bio-broth was separated using the same procedure as in Example 1 above, except that the demulsifier and amount is as set forth in Table 8 below. On the scale, 3.8 ml phase separation was considered to be essentially complete separation.

TABLE 8

| | Interface Level (ml) after Specified Centrifuge Time | |
|---|---|---|
| Time | Control (No Demulsifier) | KR-DP0320 3,000 µl of demulsifier composition per liter of bio-broth |
| 0.5 minutes | 9.8 ml | 3.8 |
| 1.0 minutes | 9.5 ml | 3.8 |
| 2.0 minutes | 9.1 ml | 3.8 |
| 5.0 minutes | 6.6 ml | 3.8 |

As shown in Table 8, the presence of a quaternary organopolysiloxane salt provided a significantly enhanced rate of separation and a higher degree of separation when compared to the untreated Control.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

The invention claimed is:

1. A demulsification system comprising:
    (a) an emulsion comprising an aqueous phase and an organic phase, the emulsion comprising one or more components selected from the group consisting of bio-products, microorganisms, enzymes, proteins, lipids, vitamins, carbohydrates, fats, amino acids and mixtures thereof; and
    (b) a composition comprising at least one quaternary ammonium organopolysiloxane salt thereof in an amount effective to at least partially separate the aqueous phase from the organic phase, wherein the ammonium organopolysiloxane salt thereof is represented by Formulae (I) or (II):

(R—O)—CH$_2$CH(OH)CH$_2$—R'    (I)

(R—O)—C(O)CH$_2$—R'    (II)

wherein
R is wherein A is selected from the group consisting of:
a bond, —(CH$_2$CH$_2$O)$_x$—, —(CH$_2$CH(CH$_3$)O)$_y$—, and combinations thereof;
    a is an integer from 0 to 200;
    b is an integer from 0 to 200;
    c is an integer from 1 to 200;
    each R$^1$, if present, is selected from —(CH$_2$)$_n$CH$_3$ and phenyl wherein n is an integer from 0 to 10;
    each R$^2$, if present, is —(CH$_2$)$_3$—(OCH$_2$CH$_2$)$_x$—(OCH$_2$CH(CH$_3$))$_y$—(OCH$_2$CH$_2$)$_z$—OH;
R' is selected from:

(a)

wherein R$^3$, R$^4$, and R$^5$ are each independently alkyl having from 1 to 20 carbon atoms, and X is an ion selected from the group consisting of Cl, Br, CH$_3$SO$_4$ and CH$_3$CH$_2$SO$_4$;

(b)

wherein R$^6$ is alkyl having from 6 to 20 carbon atoms; R$^7$ and R$^8$ are independently selected from the group consisting of methyl and ethyl; and n' is an integer from 1 to 5, and X is an ion selected from the group consisting of Cl, Br, CH$_3$SO$_4$ and CH$_3$CH$_2$SO$_4$; and (c)

wherein $R^9$ is alkyl having from 6 to 20 carbon atoms; and
v is an integer from 1 to 5, and X is an ion selected from the group consisting of Cl, Br, $CH_3SO_4$ and $CH_3CH_2SO_4$; and
each x, y and z are independently selected integers each ranging from 0 to 20.

2. A method for demulsifying an emulsion comprising an aqueous phase and an organic phase, comprising (a) adding an effective amount of a composition to an emulsion comprising an aqueous phase and an organic phase to at least partially separate the aqueous phase from the organic phase, the composition comprising at least one quaternary ammonium organopolysiloxane salt thereof, wherein the quaternary ammonium organopolysiloxane salt thereof is represented by Formulae (I) or (II):

$$(R—O)—CH_2CH(OH)CH_2—R' \qquad (I)$$

$$(R—O)—C(O)CH_2—R' \qquad (II)$$

wherein
R is wherein A is selected from the group consisting of:
a bond, $—(CH_2CH_2O)_x—$, $—(CH_2CH(CH_3)O)_y—$, and combinations thereof;
a is an integer from 0 to 200;
b is an integer from 0 to 200;
c is an integer from 1 to 200;
each $R^1$, if present, is selected from $—(CH_2)_nCH_3$ and phenyl wherein n is an integer from 0 to 10;
each $R^2$, if present, is $—(CH_2)_3—(OCH_2CH_2)_x—(OCH_2CH(CH_3))_y—(OCH_2CH_2)_z—OH$;
R' is selected from:

(a)

wherein $R^3$, $R^4$, and $R^5$ are each independently alkyl having from 1 to 20 carbon atoms, and X is an ion selected from the group consisting of Cl, Br, $CH_3SO_4$ and $CH_3CH_2SO_4$;

(b)

wherein $R^6$ is alkyl having from 6 to 20 carbon atoms; $R^7$ and $R^8$ are independently selected from the group consisting of methyl and ethyl; and n' is an integer from 1 to 5, and X is an ion selected from the group consisting of Cl, Br, $CH_3SO_4$ and $CH_3CH_2SO_4$; and (c)

wherein $R^9$ is alkyl having from 6 to 20 carbon atoms; and
v is an integer from 1 to 5, and X is an ion selected from the group consisting of
Cl, Br, $CH_3SO_4$ and $CH_3CH_2SO_4$; and
each x, y and z are independently selected integers each ranging from 0 to 20, wherein the emulsion comprises one or more components selected from the group consisting of bioproducts, microorganisms, enzymes, proteins, lipids, vitamins, carbohydrates, fats, amino acids and mixtures thereof, wherein the emulsion is a waste oil emulsion comprising an aqueous phase in an oil phase.

3. A method for demulsifying an emulsion comprising an aqueous phase and an organic phase, comprising (a) adding an effective amount of a composition to an emulsion comprising an aqueous phase and an organic phase to at least partially separate the aqueous phase from the organic phase, the composition comprising at least one quaternary ammonium organopolysiloxane salt thereof, wherein the quaternary ammonium organopolysiloxane salt thereof is represented by Formulae (I) or (II):

$$(R—O)—CH_2CH(OH)CH_2—R' \qquad (I)$$

$$(R—O)—C(O)CH_2—R' \qquad (II)$$

wherein
R is wherein A is selected from the group consisting of:
a bond, $—(CH_2CH_2O)_x—$, $—(CH_2CH(CH_3)O)_y—$, and combinations thereof;
a is an integer from 0 to 200;
b is an integer from 0 to 200;
c is an integer from 1 to 200;

each $R^1$, if present, is selected from —$(CH_2)_nCH_3$ and phenyl wherein n is an integer from 0 to 10;

each $R^2$, if present, is —$(CH_2)_3$—$(OCH_2CH_2)_x$—$(OCH_2CH(CH_3))_y$—$(OCH_2CH_2)_z$—OH;

R' is selected from:

(a)

wherein $R^3$, $R^4$, and $R^5$ are each independently alkyl having from 1 to 20 carbon atoms, and X is an ion selected from the group consisting of Cl, Br, $CH_3SO_4$ and $CH_3CH_2SO_4$;

(b)

wherein $R^6$ is alkyl having from 6 to 20 carbon atoms; $R^7$ and $R^8$ are independently selected from the group consisting of methyl and ethyl; and n' is an integer from 1 to 5, and X is an ion selected from the group consisting of Cl, Br, $CH_3SO_4$ and $CH_3CH_2SO_4$; and (c)

wherein $R^9$ is alkyl having from 6 to 20 carbon atoms; and v is an integer from 1 to 5, and X is an ion selected from the group consisting of Cl, Br, $CH_3SO_4$ and $CH_3CH_2SO_4$; and each x, y and z are independently selected integers each ranging from 0 to 20, wherein the emulsion comprises one or more components selected from the group consisting of bioproducts, microorganisms, enzymes, proteins, lipids, vitamins, carbohydrates, fats, amino acids and mixtures thereof, wherein the emulsion is wastewater.

* * * * *